US008823633B2

(12) United States Patent
Ogi et al.

(10) Patent No.: US 8,823,633 B2
(45) Date of Patent: Sep. 2, 2014

(54) IMAGE DISPLAY DEVICE

(75) Inventors: Yuya Ogi, Yokohama (JP); Yasutaka Tsuru, Yokohama (JP); Kazuhiko Tanaka, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 481 days.

(21) Appl. No.: 13/079,076

(22) Filed: Apr. 4, 2011

(65) Prior Publication Data

US 2011/0249039 A1 Oct. 13, 2011

(30) Foreign Application Priority Data

Apr. 9, 2010 (JP) ................................ 2010-090028

(51) Int. Cl.
*G09G 3/36* (2006.01)
*G02F 1/1335* (2006.01)
*G09G 3/34* (2006.01)

(52) U.S. Cl.
CPC .......... *G09G 3/3426* (2013.01); *G09G 2360/16* (2013.01); *G09G 3/3611* (2013.01); *G09G 2320/064* (2013.01); *G09G 2320/0646* (2013.01); *G09G 2320/0233* (2013.01); *G09G 2320/062* (2013.01); *G09G 2330/021* (2013.01)
USPC .............................. 345/102; 345/690; 349/65

(58) Field of Classification Search
USPC .............................. 345/690, 87–104; 349/65
See application file for complete search history.

(56) References Cited

U.S. PATENT DOCUMENTS

2004/0066363 A1 4/2004 Yamano et al.
2005/0128374 A1* 6/2005 Furukawa ...................... 349/56
2005/0253825 A1 11/2005 Kawamura et al.
2006/0139952 A1 6/2006 Inoue et al.
2007/0025683 A1 2/2007 Nobori
2007/0247871 A1 10/2007 Yoo (Continued)

FOREIGN PATENT DOCUMENTS

CN 1697002 11/2005
CN 1697999 11/2005

(Continued)

OTHER PUBLICATIONS

Office Action in Chinese Patent Appln. 20130418008844360, dated Apr. 23, 2013 (in Chinese) [8 pgs.].

(Continued)

*Primary Examiner* — Dorothy Harris
(74) *Attorney, Agent, or Firm* — Antonelli, Terry, Stout & Kraus, LLP.

(57) ABSTRACT

In a liquid-crystal display device including an edge-light-scheme-employed backlight device, it is implemented to reduce its power consumption while maintaining its excellent picture-quality. The present invention is applied to the backlight device with a plurality of edge-light-scheme backlight cells in a matrix-like manner including a LED light-source, and a light-guiding plate for emitting light. The intensity of light from a backlight cell positioned at a screen's peripheral portion is so controlled as to be made lower than the intensity of light from a backlight cell at a central portion. The light intensity of a backlight cell having a LED light-source adjacent to a first edge portion of the illumination surface of the backlight device is so controlled as to be made higher than the light intensity of a backlight cell adjacent to a second edge portion opposed to the first edge portion.

8 Claims, 10 Drawing Sheets

(56) References Cited

U.S. PATENT DOCUMENTS

| | | | | |
|---|---|---|---|---|
| 2008/0278432 | A1 | 11/2008 | Oshima | |
| 2009/0009456 | A1 | 1/2009 | Ohshima | |
| 2009/0086506 | A1 | 4/2009 | Okumura | |
| 2010/0103346 | A1 * | 4/2010 | Ajichi et al. | 349/62 |

FOREIGN PATENT DOCUMENTS

| | | |
|---|---|---|
| CN | 101572066 | 11/2009 |
| EP | 2 113 904 | 11/2009 |
| JP | 2002-341842 | 11/2002 |
| JP | 2007-104377 | 4/2007 |
| JP | 2007-293339 | 11/2007 |
| JP | 4073435 | 2/2008 |
| JP | 2008-066101 | 3/2008 |
| JP | 2009-42652 | 2/2009 |
| JP | 2009-87762 | 4/2009 |
| JP | 2009-128733 | 6/2009 |
| JP | 2010-55108 | 3/2010 |
| JP | 2010-097909 | 4/2010 |
| WO | WO 2007/132370 | 11/2007 |
| WO | WO 2008136349 A1 * | 11/2008 |
| WO | WO2009/040722 | 4/2009 |
| WO | WO 2009/101727 | 8/2009 |

OTHER PUBLICATIONS

Office Action in Chinese Patent Appln. 201110092547.5, dated Jan. 13, 2014 , [in Chinese, 10 pgs/].

Office Action in Japanese Patent Appln. 2010-090028, dated Oct. 1, 2013 (in Japanese) [2 pgs.].

* cited by examiner

FIG.1A
100
| | | | | | |
|---|---|---|---|---|---|
| 245 | 255 | 255 | 255 | 255 | 245 |
| 240 | 255 | 255 | 255 | 255 | 240 |
| 240 | 245 | 255 | 255 | 245 | 240 |
| 235 | 240 | 245 | 245 | 240 | 235 |
| 230 | 235 | 240 | 240 | 235 | 230 |
101
y
FIG.1B
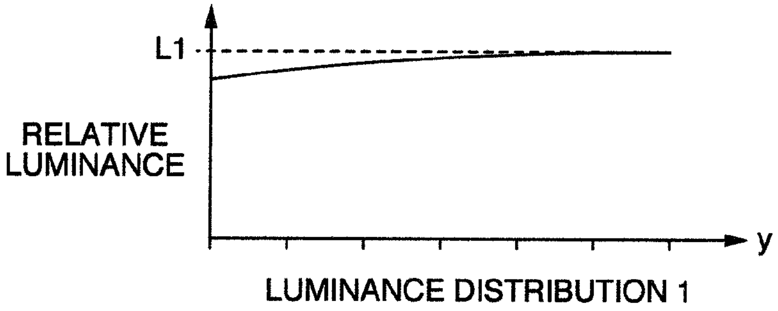
FIG.1C
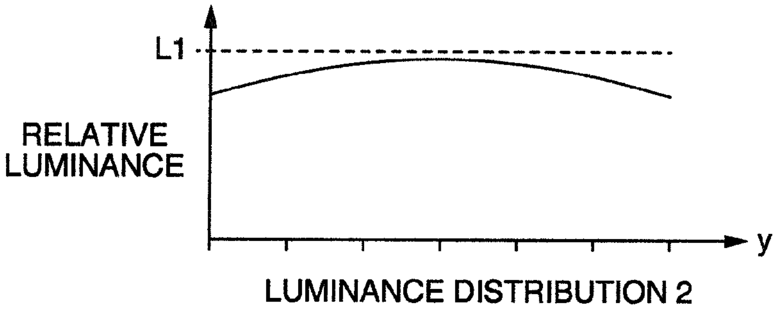
FIG.2
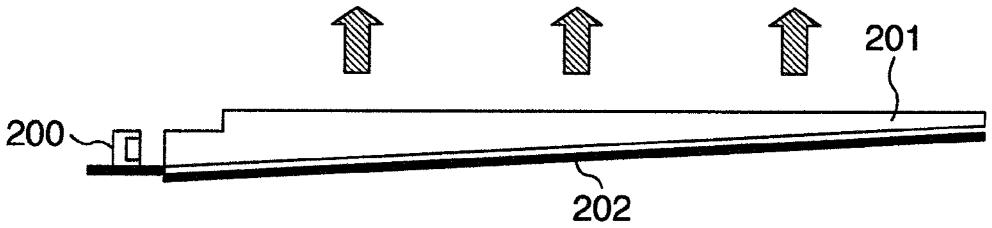

IMAGE DISPLAY DEVICE

INCORPORATION BY REFERENCE

The present application claims priority from Japanese application JP2010-090028 filed on Apr. 9, 2010, the content of which is hereby incorporated by reference into this application.

BACKGROUND OF THE INVENTION

The present invention relates to an image display device for displaying an image by modulating lights from backlights using, e.g., a liquid-crystal display panel, and a backlight device used for this image display device. More particularly, it relates to an image display device which is so configured as to divide an image display region into a plurality of regions, and to control the brightness of a backlight in each region, and a backlight device used for this image display device.

Basically speaking, image display devices can be classified into self-light-emitting-type image display devices such as CRT (: Cathode Ray Tube), and non-light-emitting-type image display devices such as liquid-crystal display (which is also referred to as "liquid-crystal display device" or "liquid-crystal display panel").

As the non-light-emitting-type image display devices, there exist an image display device which uses a reflection-type light modulation element for adjusting the light's reflection light amount in accordance with an image signal, and an image display device which uses a translucence-type light modulation element for adjusting the light's translucence light amount in accordance with the image signal. In particular, the liquid-crystal display device uses the liquid-crystal display panel as the translucence-type light modulation element, and is equipped with an illumination device (which is also referred to as "backlight device") on the rear surface of the display panel. Since the liquid-crystal display device is a thin-type and lightly-weighted display device, the liquid-crystal display device is employed as various kinds of display devices such as computer's monitor and television.

Here, basically speaking, the backlight schemes in the liquid-crystal display device are classified into the two schemes, i.e., the directly-below scheme and the edge-light scheme. The directly-below scheme is the following scheme: Namely, one or more fluorescent lamps or LEDs (: Light-Emitting Diodes), which become light-sources, are arranged directly below the liquid-crystal display panel. Meanwhile, the edge-light scheme is as follows: Namely, one or more fluorescent lamps or LEDs, which become light-sources, are deployed at an end portion (i.e., edge portion) of a plate-profiled light-guiding plate that is formed using, e.g., an acryl plate. Moreover, the light-sources are converted into a surface light-source by taking advantage of the multiple reflection inside the light-guiding plate.

By the way, in the self-light-emitting-type image display devices the representative of which is the CRT, when displaying an image, a particular pixel is selectively caused to emit light in a necessary light amount in accordance with an image signal. Also, in an aspect of the picture-quality, from the relationship of a distance with the deflection center of an electron beam used in the image display devices, the luminance of the standard field-of-view (whose horizontal angle: ±15°, uppermost angle: 8°, and lowermost angle: 12°), i.e., the standard visual angle of the NTSC (: National Television System Committee) television scheme, is made relatively higher as compared with the luminance of a screen's peripheral portion from the screen's center. Here, if the luminance outside the standard field-of-view is equivalent to or is higher than the luminance inside the standard field-of-view, humans feel a sense of strangeness on their sense of sight. Based on this fact, in the range of a sense-of-sight-range's effective field-of-view that humans possess, it has become possible to implement an image display where there occurs none of the sense of strangeness on the humans' sense of sight.

In contrast to this situation of the self-light-emitting-type image display devices, in the non-light-emitting-type image display devices such as, in general, the liquid-crystal display device, the backlights are caused to emit lights in such a manner that a constant brightness of each backlight is always maintained regardless of the image signal. Accordingly, the backlights are usually caused to emit the lights so that the brightness (which is also referred to as "luminance") of the screen becomes equal to its maximum value. This fact gives rise to the occurrence of the virtual sense of strangeness on the humans' sense of sight. As a result, when the liquid-crystal display device is compared with the CRT, a little unsatisfactoriness has remained in the aspect of the picture-quality.

In order to address the above-described problem, from conventionally, the proposal has been made concerning the following liquid-crystal display device: Namely, by controlling the brightness of each backlight, this liquid-crystal display device makes it possible to implement the image display where, in the range of the sense-of-sight-range's effective field-of-view that humans possess, there occurs none of the sense of strangeness on the humans' sense of sight. Conventionally, as this type of technology, there has been known a technology disclosed in, e.g., JP-A-4073435, the counterpart US Publication of which is US 2006/0139952.

This technology disclosed in JP-B-4073435 is as follows: Namely, in the directly-below-scheme backlights where the LEDs are used as the light-sources, as illustrated in, e.g., FIG. 14, the backlights are divided into a plurality of regions (i.e., region 1 to region 4) in a substantially concentric manner from the screen center. Furthermore, the luminances of the light-sources are controlled for each region divided. This control method makes it possible to reduce the consumption power, while implementing the image display where there occurs none of the sense of strangeness on the humans' sense of sight.

SUMMARY OF THE INVENTION

In the conventional liquid-crystal display device disclosed in JP-B-4073435, however, there have existed two problems, which will be described hereinafter:

The first problem is the following point: No consideration is given to a difference between luminance distributions, which is caused to occur by the difference between the backlight structures. Namely, in the directly-below-scheme backlight structure, the incident direction of the light emitted from an arbitrary single light-source becomes substantially perpendicular to the liquid-crystal display panel. As a result, the ways in which the lights introduced into the liquid-crystal display panel will diffuse become substantially the same. Accordingly, a uniform and even luminance distribution is formable and acquirable. Meanwhile, in the edge-light-scheme backlight structure, the light-sources are converted into the surface light-source by taking advantage of the multiple reflection inside the light-guiding plate. As a result, the ways in which the lights will diffuse become different, depending on the incident directions of the lights. Consequently, the uniform and even luminance distribution is difficult to form and acquire.

The second problem is the following point: The light-emission luminances of the light-sources for each divided region are controlled in the substantially concentric manner. As a result, when the conventional liquid-crystal display device is applied to a system which is dynamically controlled in accordance with an image signal and/or a video mode which is to be selected by the user, a sense of realistic presence is damaged, depending on a video displayed. For example, if a bright object exists at the screen's edge portion of an as-a-whole dark video, the humans' attention point is directed and focused onto this bright object. At this time, however, the luminance of the bright object becomes lowered by the execution of the control over the luminances of the light-sources of the backlights in the substantially concentric manner from the screen center. As a result, it turns out that the impact given by the video is reduced.

In view of the above-described problems, the present invention has been devised. Namely, an object of the present invention is to provide a technology for allowing a high-grade image to be displayed while reducing the consumption power in a backlight device employing the edge-light scheme, and an image display device employing this backlight device.

In the present invention, as is disclosed in the appended claims, there is provided a backlight which is constituted by arranging a plurality of edge-light-scheme backlight cells in a matrix-like manner, each of the backlight cells including a light-source, and a light-guiding plate for emitting light from the light-source toward a display panel, wherein the intensity of light from a backlight cell positioned at a screen's peripheral portion is controlled in such a manner that the intensity of the light becomes lower than the intensity of light from a backlight cell positioned at a screen's central portion. Moreover, the light intensity of a backlight cell having a LED light source, which is adjacent to a first edge portion of the illumination surface of the backlight, is controlled in such a manner that the light intensity becomes higher than the light intensity of a backlight cell which is adjacent to a second edge portion opposed to the first edge portion.

According to the configuration of the present invention, in the edge-light-scheme-employed backlight device, the shading processing is executed which is intended to make the luminance at a screen's peripheral portion relatively lower as compared with the luminance at a screen's central portion. The execution of this shading processing allows a high-grade image to be displayed while reducing the consumption power.

Other objects, features and advantages of the invention will become apparent from the following description of the embodiments of the invention taken in conjunction with the accompanying drawings.

BRIEF DESCRIPTION OF THE DRAWINGS

FIGS. 1A to 1C are schematic diagrams for illustrating the overview and luminance distributions of a backlight device according to an embodiment of the present invention;

FIG. 2 is a diagram for illustrating a configuration example of the edge-light-scheme-employed backlight cell;

DESCRIPTION OF THE INVENTION

Figure 3:
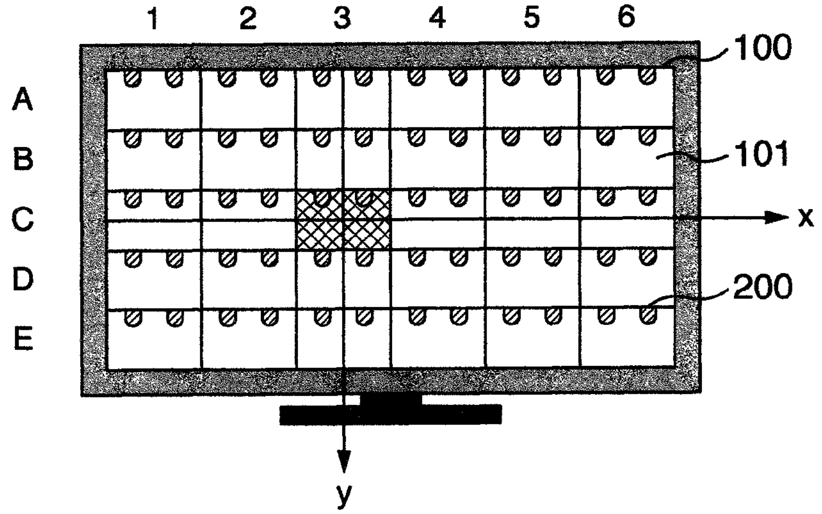
FIG. 3 is a diagram for illustrating a configuration example of the backlight device according to an embodiment of the present invention.

Hereinafter, referring to the drawings, the detailed explanation will be given below concerning embodiments of the present invention.

1st Embodiment

FIG. 1A is a schematic diagram for illustrating an edge-light-scheme backlight device in a liquid-crystal display device according to an embodiment of the present invention. This backlight device is constituted by arranging a plurality of backlight cells (101) in a matrix-like manner. This backlight device is so constituted as to illuminate the entire area of a display region (100) of a (not-illustrated) liquid-crystal display panel.

The size of this display region (100) is so set as to be substantially equal to the size of an illumination surface (i.e., sum total of the areas of the backlight cells (101)) of the backlight device. As will be described later, each numerical figure given inside each backlight cell (101) indicates the level of a video control signal for controlling the brightness (i.e., luminance) of each backlight cell (101).

FIG. 2 illustrates a configuration example of each backlight cell (101). Each backlight cell (101) includes a LED light-source (200), a light-guiding plate (201), and a reflection plate (202), respectively. When the light-guiding plate (201) is seen from above (i.e., from the side opposed to the illumination direction of the light emitted from the backlight device), the light-guiding plate (201) forms a rectangle-like profile as is illustrated in FIG. 1A. Also, the longitudinal-direction cross-section of the light-guiding plate (201) on the backlight device's illumination surface forms a wedge-like profile as is illustrated in FIG. 2. This wedge-like profile concretely means that the thickness of the cross-section of the light-guiding plate (201) becomes gradually thinner from its light-incident end portion, into which the light is introduced, to its front-end portion opposed to this light-incident end portion. This wedge-like profile plays a role of converting the luminance distribution of the emitted light from the light-guiding plate (201) into a uniform and even luminance distribution in the range from the light-incident end portion to the front-end portion.

In FIG. 2, the LED light-source (200) is deployed on the side of the upper-end's light-incident end portion of the light-guiding plate (201). Accordingly, the LED light-source (200) emits the light toward the light-guiding plate (201) in a direction oriented from its upper side to its lower side. Moreover, the light emitted from the LED light-source (200) is introduced into the light-incident end portion (i.e., edge portion) of the light-guiding plate (201), where the thickness of the cross-section of the light-guiding plate (201) is thicker. Furthermore, the light introduced into the light-guiding plate (201) is subjected to the multiple reflection inside the light-guiding plate (201). Then, this multiple reflection causes the light to be emitted from the upper surface of the plate (201) in the liquid-crystal display panel's direction (i.e., arrows'direction in the drawing). Also, light, which has passed through outside the light-guiding plate (201) from the lower surface of the light-guiding plate (201), is reflected by the reflection plate (202) deployed under the lower surface of the light-guiding plate (201). As a result, the light is retuned back to the light-guiding plate (201) again, thereby being emitted from the upper surface of the light-guiding plate (201). These processes play a role of converting the point light-source such as the LED into a surface light-source. Incidentally, in the present embodiment, the side-view-type LED for emitting light in a direction parallel to the electrode surface is used as the LED light-source (200). It is also allowable, however, to use the top-view-type LED for emitting light in a direction perpendicular to the electrode surface.

FIG. 3 is a schematic diagram for illustrating a liquid-crystal display device where the intensities of the lights emitted from the respective backlight cells (101) are made independently controllable. In the liquid-crystal display device in the present embodiment, the backlight device is constituted by arranging the six units of backlight cells (101) in the screen's horizontal direction (: x axis), and the five units of backlight cells (101) in the screen's vertical direction (: y axis). As a result, the backlight device's illumination surface is divided into thirty regions. Also, the LED light-source (200) is assumed to emit the light in a direction oriented from the screen's upper portion to the screen's lower portion. Each backlight cell (101) is equipped with the two units of LED light-sources (200). The intensities of the lights emitted from the respective backlight cells (101) are controlled such that these two units of LED light-sources (200) are defined as one set, and that this one set of the LED light-sources (200) is employed as the control unit for controlling the intensities. The number of the LED light-sources (200) provided in each backlight cell (101) is not limited to the two units, but may also be, e.g., one or three units. It is assumed that the position of each backlight cell (101), i.e., the position of each region on the backlight device's illumination surface, is specified using numerical figures and English characters (i.e., 1 to 6 and A to E) which are arranged in the x-axis direction and the y-axis direction illustrated in FIG. 3.

Here, the intensity of the light emitted from each backlight cell (101) is controlled based on the maximum luminance of a video control signal in a portion of the display region corresponding to each backlight cell (101). For example, assume that the maximum luminance made displayable by this liquid-crystal display device is equal to 255. Such an amount of luminance is indicated by means of eight-bits digital signal. At this time, if the maximum luminance of a video control signal in a portion of the display region corresponding to a region C3 is equal to, e.g., 127, the maximum luminance of this region C3 becomes equal to about the one-half of the displayable maximum luminance. Accordingly, the light intensity of the region C3 is regarded as being about the one-half of the maximum output of the LED light-sources (200). Also, if the maximum luminance of a video control signal in a portion of the display region corresponding to a region A1 is equal to, e.g., 0, the light intensity of the region A1 is regarded as being 0. This control method allows the light intensities from the backlight device to be locally controlled on each region basis (i.e., for each backlight cell (101)) in accordance with a video control signal corresponding to each region.

Figure 4:
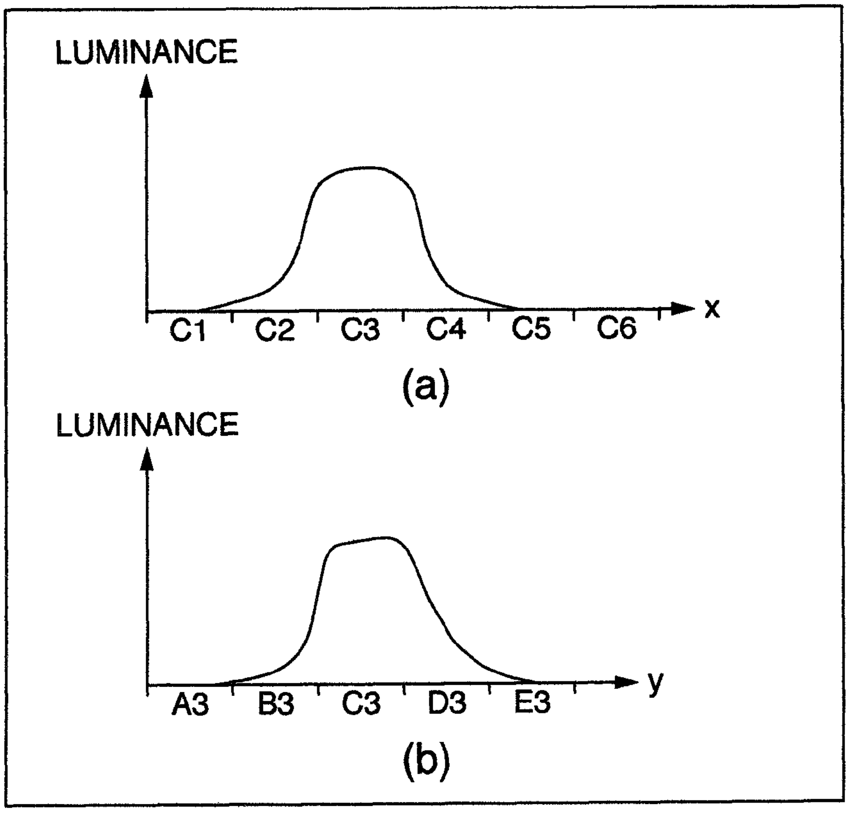
FIG. 4 is a diagram for illustrating the luminance distributions of the backlight cell.

FIG. 4 illustrates the luminance distributions along the respective x-axis direction (a) and y-axis direction (b) at the time when the backlight cell (101) of the region C3 illustrated in FIG. 3 emits the light. Here, it is assumed that the regions adjacent to the region C3 extinguish lights. As will be shown from the drawing, the light-emission of the region C3 exerts an influence on the adjacent regions (such as, e.g., C2 and D3). Namely, light in a certain region will diffuse (i.e., leaks) into regions which are adjacent thereto. Also, as illustrated in FIG. 3, the way in which this light will diffuse becomes different between the x-axis direction and the y-axis direction. The reason for the occurrence of this difference is as follows: Namely, in the edge-light scheme, the light emitted from the LED light-sources (200) is introduced into the edge portion of the light-guiding plate (201) in substantially parallel to the liquid-crystal display panel. Moreover, the light introduced into the light-guiding plate (201) is emitted from the upper surface of the plate (201) by being subjected to the multiple reflection inside the plate (201). As described earlier, the light-guiding plate (201) forms the wedge-like profile, where the thickness of the light-guiding plate (201) becomes gradually thinner from the light-incident end portion to the front-end portion. This wedge-like profile is given in order that the luminance distribution of the emitted light from the light-guiding plate (201) becomes the uniform and even luminance distribution in the range from the light-incident end portion to the front-end portion. Even in the wedge-like profile like this, however, the light-emission amount becomes larger in a proximity to the front-end portion as compared with the light-incident end portion. This is because the proximity to the front-end portion is positioned more ahead of the light-emission direction of the LED light-sources (200) as compared with the light-incident end portion. For example, as illustrated in the luminance distribution (b) in FIG. 4, the luminance distribution of the region C3 exhibits the following uneven luminance distribution: Namely, the luminance on the side of the region C3 where the LED light-sources (200) are deployed (i.e., the side in closer proximity to a region B3) becomes relatively lowered as compared with the luminance on the side of the region C3 where the LED light-sources (200) are not deployed (i.e., the side in closer proximity to the region D3). On the other hand, as illustrated in the luminance distribution (a) in FIG. 4, the light distribution profile in the x-axis direction exhibits a substantial symmetry. This is because the profile of the light-guiding plate (201) has a symmetry with the y axis regarded as its criterion.

FIG. 1B illustrates the luminance distribution in the y-axis direction at the screen's central portion at the time when the backlight cells (101) having the luminance characteristics as described above are lit up with the same luminance set thereto. In the luminance distribution of each backlight cell (101) in the y-axis direction, just like the luminance distribution (b) in FIG. 4, the luminance on the side of each backlight cell (101) where the LED light-sources (200) are deployed is relatively lower than the luminance on the side of each backlight cell (101) where the LED light-sources (200) are not deployed. Simultaneously, light leaks partially into a certain backlight cell (in, e.g., the E-th row) from a backlight cell (in, e.g., the D-throw) which is adjacent thereto in the upward direction. As a result of these two factors, the luminance at the screen's uppermost portion becomes relatively lowered as compared with the luminance at the screen's lowermost portion. As a consequence, there occurs a phenomenon that the screen's lowermost portion exhibits the maximum luminance (i.e., L1) on a certain single screen.

In view of this situation, in the present embodiment, the intensity of the emitted light from each backlight cell (101) is controlled in such a manner that the uneven luminance-distribution profile of the edge-light-scheme-employed backlight cells (101) is taken into consideration. This control is performed in order to acquire the luminance distribution where the luminance at the screen's central portion becomes relatively higher than the luminance at the screen's peripheral portion.

FIG. 1A illustrates the one example of the control over each backlight cell (101) according to the present embodiment in a case where, on the entire illumination surface of the backlight device, the light with the maximum luminance is emitted at the time of, e.g., the entire-white display. In FIG. 1A, each numerical figure given inside each backlight cell (101) indicates the level of a video control signal which is supplied to each backlight cell (101) for controlling the brightness (i.e., luminance) of each backlight cell (101).

In the present embodiment, as illustrated in FIG. 1A, the control signals (e.g., 255 at 8-bit signal), which allow implementation of the maximum luminance, are set as control signals which are to be transmitted to the backlight cells (101) positioned at the screen's uppermost portions in FIG. 1A (i.e., the backlight cells (101) corresponding to the regions A1 to A6 in FIG. 3). Meanwhile, the control signals, which are made lower in a step-by-step manner as compared with the above-described control signals to be transmitted to the backlight cells (101) positioned at the screen's uppermost portions, are set for the backlight cells (101) which are positioned at the screen's lower portions in FIG. 1A, and whose luminances become relatively lower. For example, in the backlight cells (101) positioned in the second and third columns, the control signals to be transmitted to the backlight cells (101) positioned in the D-th row are made lower as compared with the control signals to be transmitted to the backlight cells (101) positioned in the A-th to C-th rows (i.e., the regions A2 to A3, B2 to B3, and C2 to C3). Moreover, the control signals to be transmitted to the regions (E2 to E3) positioned in the E-th row i.e., at the screen's lowermost portions, are made even lower as compared with the control signals to be transmitted to the backlight cells (101) positioned in the D-th row. Also, in the x-axis direction, the control signals are made lower in a step-by-step manner in the directions oriented from the center of the x axis to the right and left end portions. Accordingly, the control signals are made the lowest in the regions at the right and left end portions (i.e., regions in the first and sixth columns). Namely, in the present embodiment, the value of each control signal is changed, depending on the position of each backlight cell (101) in the x-axis and y-axis directions. For example, the control signals to be transmitted to the regions E1 and E6 positioned at the right and left lowermost portions are made the lowest of all the backlight cells (101). This is because the luminances of the regions E1 and E6 are relatively higher, and are wished to be made lower than the luminance at the screen's central portion. Also, the control signals to be transmitted to the regions A1 and A6 positioned at the right and left uppermost portions are made higher than the regions E1 and E6 positioned at the right and left lowermost portions. This is because the luminances of the regions A1 and A6 are relatively lower.

In this way, in the present embodiment, the light-emission luminance of each backlight cell (101) is controlled so that the uneven luminance distribution of the edge-light-scheme-employed backlight cells (101) is corrected. This control makes it possible to acquire the corrected luminance distribution where the luminance at the screen's peripheral portion is relatively lower as compared with the luminance at the screen's central portion. This luminance distribution is illustrated in, e.g., FIG. 1C. This control also allows the consumption power to be reduced while reducing a luminance unevenness caused by the above-described luminance distribution. Hereinafter, the control signal for controlling the light-emission luminance of each backlight cell (101) as described above will be referred to as "shading signal". Also, the processing for making the luminance at the screen's peripheral portion relatively lower than the luminance at the screen's central portion will be referred to as "shading processing".

Figure 5:
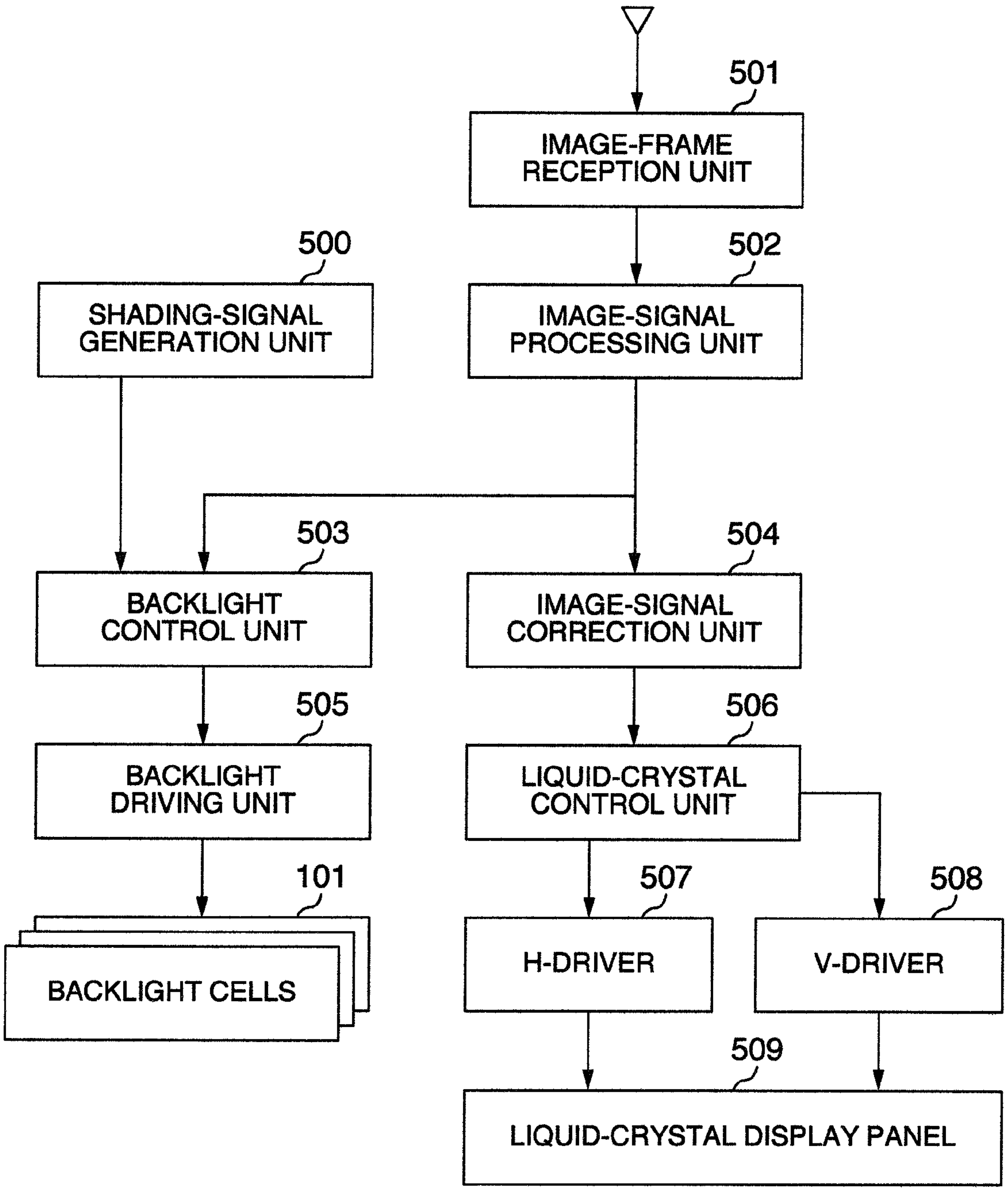
FIG. 5 is a circuit block diagram according to a first embodiment.

Hereinafter, referring FIG. 5, the explanation will be given below concerning one example of the circuit configuration for executing the control processing over the light intensity of the backlight device, including the above-described shading processing. FIG. 5 illustrates the one example of the circuit block for executing the shading processing which is used for the liquid-crystal display device according to the present embodiment.

As illustrated in FIG. 5, the liquid-crystal display device according to the present embodiment includes the following configuration components: A shading-signal generation unit (500) for acquiring the luminance distribution where the luminance at the screen's peripheral portion is relatively lower as compared with the luminance at the screen's central portion, an image-frame reception unit (501), an image-signal processing unit (502), a backlight control unit (503), an image-signal correction unit (504), a backlight driving unit (505), a liquid-crystal control unit (506), a H-driver (507), a V-driver (508), a liquid-crystal display panel (509), and a backlight unit including a plurality of backlight cells (101).

An image frame received by the image-frame reception unit (501) is transmitted to the image-signal processing unit (502). From the image frame inputted into the image-signal processing unit (502), the unit (502) detects the feature amount, e.g., the maximum luminance, of the image of each backlight cell (101). Moreover, the unit (502) determines the light-emission amount of each backlight cell in correspondence with this feature amount, then transmitting control signal indicating this light-emission amount to the backlight control unit (503). For example, the light-emission amount of each backlight cell may be determined such that, as described earlier, the light-emission amount is made substantially proportional to the maximum luminance of the video control signal in a portion of the display region corresponding to each backlight cell. Also, the light-emission amount of each backlight cell may also be determined by multiplying the displayable maximum luminance by a light-reducing ratio $\alpha$. This light-reducing ratio $\alpha$ is determined in the following way, for example: Namely, if the maximum luminance of each region is equal to the displayable maximum luminance, $\alpha$ is determined as $\alpha=1$, if the maximum luminance is equal to the one-half of the displayable maximum luminance, $\alpha$ is determined as $\alpha=1/2$, and if the maximum luminance is equal to 10% of the displayable maximum luminance, $\alpha$ is determined as $\alpha=1/10$. Also, the maximum luminance of each region may also be detected from a luminance signal of the video control signal of each region, or may also be detected from each primary-color signal of a RGB signal. Also, the above-described feature amount of the image can be detected by, e.g., individually calculating the luminance histogram of the image corresponding to each backlight cell (101). In addition to the maximum luminance, information usable as the feature amount of the image is an average picture level (: APL), or a luminance difference between the previous image frame and the present image frame of a certain backlight cell.

Meanwhile, the shading-signal generation unit (500) outputs each video control signal as is illustrated in, e.g., FIG. 1A. The value of each video control signal is set in advance by taking into consideration the uneven luminance distribution on the backlight device's illumination surface as is illustrated in, e.g., FIG. 1B.

In the backlight control unit (503), the weight of the light-emission amount of each backlight cell (101) determined by the image-signal processing unit (502) is assigned to each video control signal generated by the shading-signal generation unit (500). After that, each weight-assigned video control signal is transmitted to the backlight driving unit (505) as a driving signal. Furthermore, based on the driving signal transmitted from the backlight control unit (503), the backlight driving unit (505) controls light-up of the LED light-sources (200) of each backlight cell (101).

The configuration of the shading-signal generation unit (500) for generating each video control signal is as follows: Each backlight cell (101) may also be implemented using software. Also, when the circuit in FIG. 5 is constituted with a 1-chip IC, this software may be integrated into a main microcomputer which is prepared independently of this IC, and which is designed for controlling the entire image display device. Also, each video control signal may also be generated as follows: The data for generating each video control signal of each backlight cell (101) is calculated in advance, then being memorized into a memory the representative of which is, e.g., a ROM. Moreover, each video control signal is generated while making reference to this calculated data as a LUT (: Look Up Table).

The driving signal for driving each backlight cell in the backlight driving unit (505) is a PWM (: Pulse Width Modulation) signal or an amplitude modulation signal. In the case of the PWM modulation, the LED light-sources (200) are PWM-controlled such that the PWM frequency is made constant, and that the ratio (i.e., duty ratio) between ON time-interval and OFF time-interval is varied in accordance with the light-emission intensity. Also, it is desirable that the PWM frequency be higher than or be substantially equivalent to the frame frequency of the liquid-crystal display device.

Also, the image-signal correction unit (504) corrects the image signal on the basis of the light-emission amount of each backlight cell (101) determined by the image-signal processing unit (502). This correction is, e.g., a processing of amplifying the video control signal with the inverse of the above-described light-reducing ratio $\alpha$ employed as the degree of amplification. If the light-reducing ratio $\alpha$ is equal to, e.g., ½, the video control signal is amplified using the inverted 2-times amplification degree. The video control signal corrected by the image-signal correction unit (504) in this way is then transmitted to the liquid-crystal control unit (506) with horizontal and vertical synchronization signals.

In the liquid-crystal control unit (506), a display control signal is generated based on the video control signal and the horizontal and vertical synchronization signals, then being transmitted to the H-driver (507) and the V-driver (508). In the H-driver (507), a display signal is generated based on the display control signal from the liquid-crystal control unit (506), then being transmitted to the liquid-crystal display panel (509). In the V-driver (508), a scanning signal synchronized with the horizontal and vertical synchronization signals is generated, then being applied to the liquid-crystal display panel (509). In the liquid-crystal display panel (509), each scanning electrode and each data electrode are driven based on the signals transmitted from the H-driver (507) and the V-driver (508). This electrode-driving allows a display-signal-corresponding gradation voltage to be applied to a corresponding pixel region, thereby making it possible to control the response of the liquid crystal in the pixel region.

In this way, in the edge-light-scheme-employed backlight device in the present embodiment, the light intensity of each backlight cell is controlled in such a manner that the light-travelling direction of the lights emitted from the LED light-sources is taken into consideration. Namely, of the plurality of backlight cells, the light intensity of a backlight cell positioned at the upstream-side end portion in the light-travelling direction is made relatively higher than the light intensity of a backlight cell positioned at the downstream-side end portion in the light-travelling direction. In other words, the light intensity of the backlight cell having the LED light-sources, which are adjacent to the first end portion (i.e., the upper-side end portion in the present embodiment) of the illumination surface of the backlight device, is made larger than the value of the control signal for the backlight cell which is adjacent to the second end portion (i.e., the lower-side end portion in the present embodiment) opposed to the first end portion. This light-intensity control allows the shading processing to be executed based on the video control signal where the uneven luminance distribution exhibited by the edge-light scheme is taken into consideration. As a result, it becomes possible to correct the luminance distribution, thereby simultaneously making it possible to acquire the corrected luminance distribution where the luminance at the screen's peripheral portion is relatively lower as compared with the luminance at the screen's central portion. This satisfying result also allows the consumption power to be reduced while implementing and acquiring the excellent picture-quality.

Incidentally, in the above-described embodiment, the backlight device's illumination surface has been divided into the thirty regions. The present invention, however, is not limited thereto. Namely, the illumination surface may also be divided into regions whose number is smaller or larger than thirty. Also, the example has been indicated where the light intensity of each backlight cell is controlled using the maximum luminance of a video control signal corresponding thereto. The present invention, however, is not limited thereto. Namely, basically the same control may also be executed using the APL (Average Picture Level). Still further, as the profile of the light-guiding plate of each backlight cell, a profile other than the one illustrated in FIG. 2 may also be used.

2nd Embodiment

Figure 6:
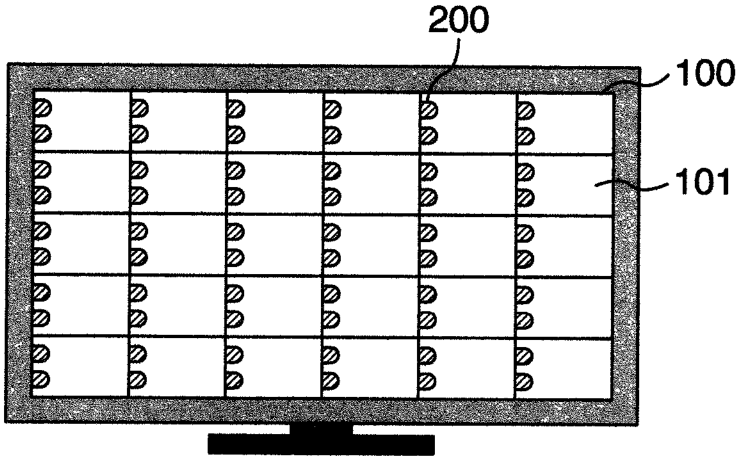
FIG. 6 is a diagram for illustrating the configuration of the backlight device according to a second embodiment.
Figure 7:
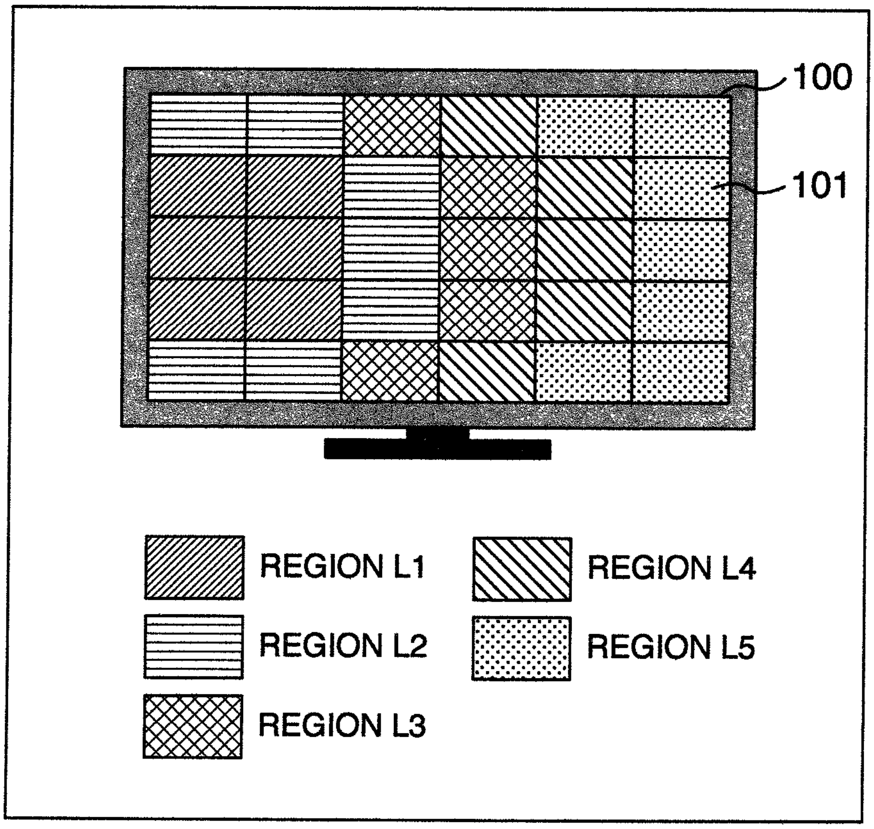
FIG. 7 is a diagram for illustrating a backlight control signal according to the second embodiment.

Hereinafter, referring FIG. 6 and FIG. 7, the explanation will be given below regarding a second embodiment of the present invention. This second embodiment differs from the first embodiment in a point of the implementation position and light-emitting direction of the LED light-sources (200) in each backlight cell (101). Namely, as illustrated in FIG. 6, the second embodiment is configured as follows: The LED light-sources (200) are provided on the side of a left-end portion of the light-guiding plate in each backlight cell (101). Accordingly, the lights emitted from the LED light-sources (200) are introduced into the light-guiding plate in parallel to the x-axis direction, i.e., the lights are introduced therein from left to right.

Even in the structure of each backlight cell (101) like this, as is the case with the first embodiment, its luminance distribution exhibits the following uneven luminance distribution because of the reason as described earlier in the first embodiment: Namely, the luminance on the side of each backlight cell (101) where the LED light-sources are deployed becomes relatively lowered as compared with the luminance on the side of each backlight cell (101) where the LED light-sources are not deployed. In order to address the case like this, as illustrated in, e.g., FIG. 7, the present embodiment is configured as follows: The above-described shading signals, which correspond to regions L1 to L5 respectively, are set at values which satisfy the following relationship: Then, the shading signals set at these values are generated by the shading-signal generation unit (500) illustrated in FIG. 5.

L1>L2>L3>L4>L5

In this way, the shading signals are changed in accordance with the light-introducing direction in the edge-light scheme. This configuration makes it possible to acquire basically the same effects as in the first embodiment. In this way, in the edge-light-scheme-employed backlight device in the present embodiment, the light intensity of each backlight cell is controlled in such a manner that the light-travelling direction of the lights emitted from the LED light-sources is taken into consideration. Namely, of the plurality of backlight cells, the light intensity of a backlight cell positioned at the upstream-side end portion in the light-travelling direction is made relatively higher than the light intensity of a backlight cell positioned at the downstream-side end portion in the light-travelling direction. In other words, the light intensity of the backlight cell having the LED light-sources, which are adjacent to the first end portion (i.e., the left-side end portion in the present embodiment) of the illumination surface of the backlight device, is made larger than the value of the control signal for the backlight cell which is adjacent to the second end portion (i.e., the right-side end portion in the present embodiment) opposed to the first end portion. This light-intensity control makes it possible to correct the uneven luminance distribution, thereby simultaneously making it possible to acquire the corrected luminance distribution where the luminance at the screen's peripheral portion is relatively lower as compared with the luminance at the screen's central portion. This satisfying result also allows the consumption power to be reduced while implementing and acquiring the excellent picture-quality.

3rd Embodiment

Next, referring FIG. 8 to FIG. 10, the explanation will be given below concerning a third embodiment of the present invention. This third embodiment differs from the first and second embodiments in the following point: Namely, this third embodiment is equipped with a configuration for compensating a lowering in the light-emission luminance of each LED light-source (200) occurring in accompaniment with a rise in the temperature. Incidentally, in the present third embodiment, the implementation position and light-emitting direction of the LED light-sources (200) in each backlight cell (101) are the same as those in the second embodiment.

Figure 8:
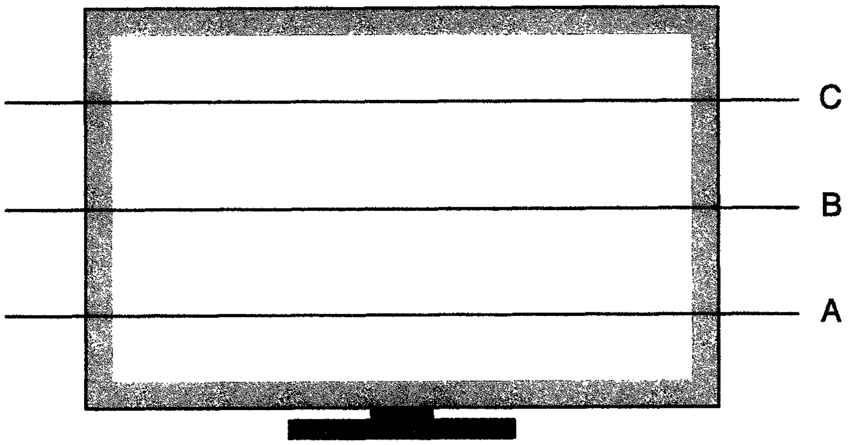
FIG. 8 is a diagram for illustrating the temperature distribution of the liquid-crystal display device.

FIG. 8 illustrates the horizontal-direction temperature distribution in the liquid-crystal display device when a maximum lit-up image such as, e.g., entire-white image, is inputted therein. As illustrated in FIG. 8, the temperature at each of positions A, B, and C set in the vertical direction rises in the range from the screen's lower portion to the screen's upper portion. This is because the heat generated by the LED light-sources (200) or the like is transferred in the upward direction of the liquid-crystal display device by the convection. Also, at each of the positions A, B, and C, the heats at the screen's right-end and left-end portions become relatively lower as compared with the heat at the screen's central portion. This is because a heat-liberation effect by the air layer occurs at the screen's end portions.

Figure 9:
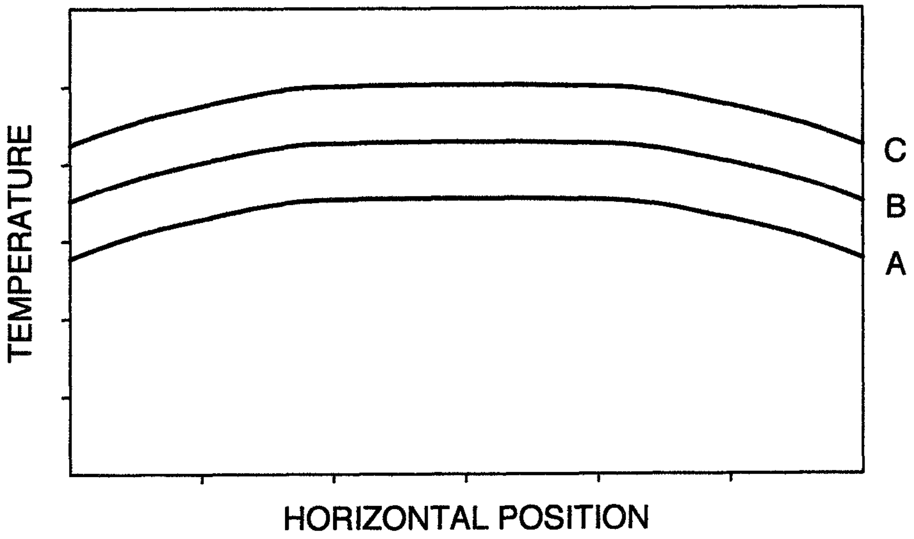
FIG. 9 is a diagram for illustrating the temperature characteristics of a LED light source.

FIG. 9 illustrates an example of the temperature characteristics of each LED light-source. As illustrated in FIG. 9, each LED light-source generally exhibits the temperature characteristics that the light-emission luminance of each LED light-source becomes lowered in accompaniment with a rise in the surrounding temperature of each LED light-source.

As a result of this temperature characteristics of each LED light-source, when the backlight cells whose luminances are substantially the same are lit up in accordance with the same control value, the luminance of each backlight cell (101) positioned at the screen's upper portion becomes even lowered in accompaniment with the rise in the surrounding temperature. As a consequence, there is a possibility that there occurs a phenomenon that the luminance at the screen's upper-end portion becomes relatively lowered.

Figure 10:
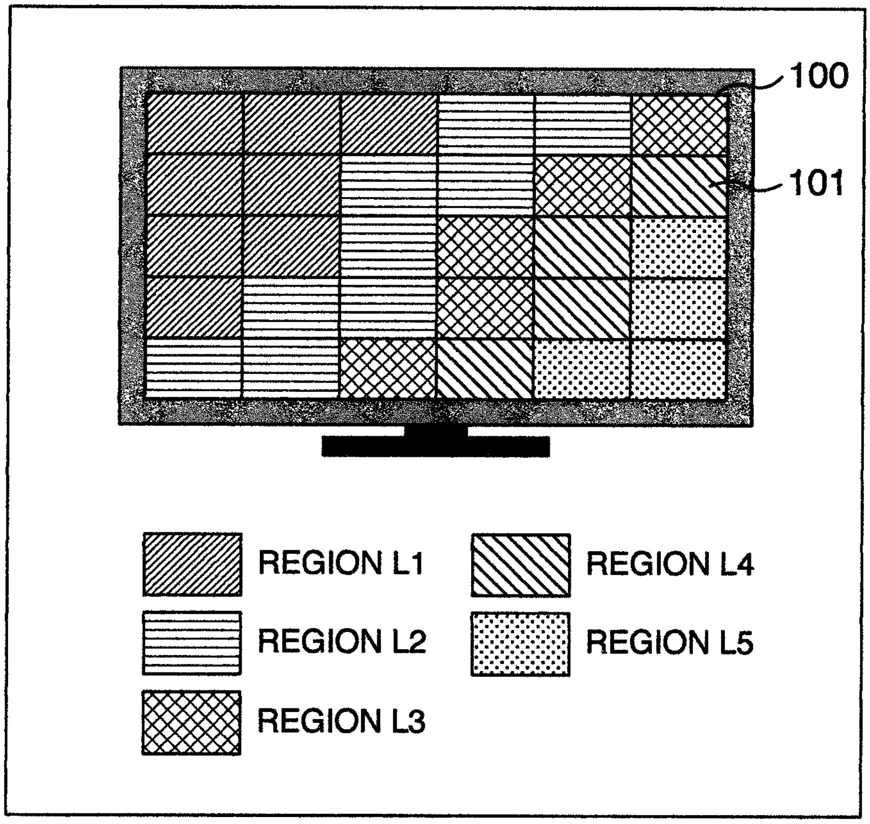
FIG. 10 is a diagram for illustrating a backlight control signal according to a third embodiment.

In view of this situation, in the present embodiment, as a countermeasure against the above-described problem, the shading signals are generated in the following manner, which is illustrated in FIG. 10: Namely, the light intensity of each backlight cell (101), which is positioned at the screen's left-end portion, and whose luminance becomes relatively lowered, and the light intensity of each backlight cell (101), which is positioned at the screen's upper-end portion, and whose temperature rises, are controlled so that these light intensities become higher. Namely, as illustrated in, e.g., FIG. 10, the present embodiment is configured as follows: The above-described shading signals, which correspond to regions L1 to L5 respectively, are set at values which satisfy the following relationship: Then, the shading signals set at these values are generated by the shading-signal generation unit (500) illustrated in FIG. 5.

L1>L2>L3>L4>L5

In the shading-signal generation unit (500), the shading signals may also be switched as follows: The data on the shading signals, which are used for correcting the lowering in the light-emission luminance of each LED light-source occurring in accompaniment with the temperature rise due to a time lapse from the time of power-supply ON, is stored in advance into a memory such as, e.g., a ROM. Moreover, the shading signals are switched by making reference to the LUT in correspondence with the elapsed time from the time of power-supply ON.

In this way, in the third embodiment, the light intensity of each backlight cell (101) is made higher which is positioned at the screen's upper-end portion, and whose temperature becomes higher and whose light intensity becomes lower. In addition to the uneven luminance distribution caused by the light-guiding plate, this light-intensity control also makes it possible to correct the uneven luminance distribution caused by the temperature rise. As a result, it becomes simultaneously possible to acquire the corrected luminance distribution where the luminance at the screen's peripheral portion is relatively lower as compared with the luminance at the screen's central portion. This satisfying result also allows the consumption power to be reduced while implementing and acquiring the excellent picture-quality.

4th Embodiment

Next, referring FIG. 11, the explanation will be given below regarding a fourth embodiment of the present invention. This fourth embodiment differs from the first and third embodiments in the following point: Namely, the shading processing is dynamically controlled in accordance with a video mode which is to be selected by the user.

Figure 11:
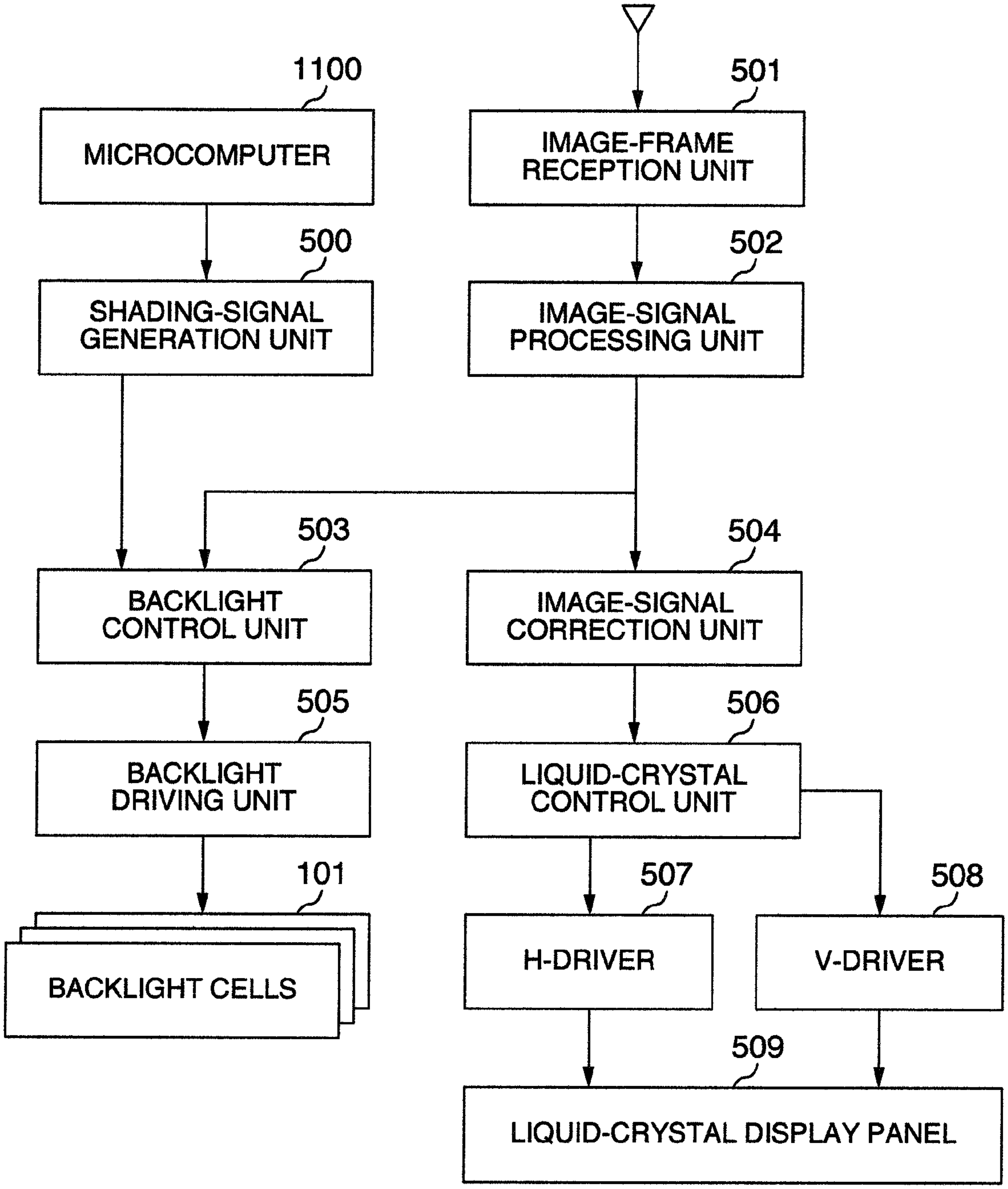
FIG. 11 is a circuit block diagram according to a fourth embodiment.

FIG. 11 illustrates a circuit block diagram in the fourth embodiment. In FIG. 11, for example, the control signals in accordance with a video mode selected by the user via a remote-controller operation are transmitted from a microcomputer (1100) to the shading-signal generation unit (500). Then, the shading signals are controlled in accordance with the control signals in the shading-signal generation unit (500).

For example, in a video mode where video contents such as movie are watched by the user, the user' attention point is not always directed and focused onto a substantially central region of, e.g., the movie. Namely, as is typical of the subtitles, the user' attention point is displaced onto a screen's end portion in some cases. In view of this situation, in the present embodiment, the shading signals are controlled as follows, using the microcomputer (1100): Namely, in the case where the video contents such as movie are displayed, the luminance at the screen's peripheral portion, which is made lower than the luminance at the screen's central portion by the shading processing, is controlled so that the luminance at the screen's peripheral portion becomes relatively higher as compared with the one in a case where video contents such as information program, e.g., news program, are displayed. Namely, the microcomputer (1100) controls the shading-signal generation unit (500) so that the unit (500) switches the shading signals in accordance with the video contents to be displayed then. For example, in the case where the video contents such as movie are displayed, the luminance at the screen's peripheral portion relative to the luminance at the screen's central portion is set at 100% to 80%. Meanwhile, in the case where the video contents such as information program are displayed, the luminance at the screen's peripheral portion relative to the luminance at the screen's central portion is set at 80% to 65%.

What type of contents' program should be displayed on the screen, i.e., whether a movie should be displayed or an information program should be displayed, can be judged by, e.g., identifying which of the video modes is specified by a remote-control signal transmitted from the remote controller. Namely, it is conceivable that, in many cases, the user selects "cinema mode" as the video mode in the case where the user wishes to view a movie; whereas, the user selects "normal mode" as the video mode in the case where the user wishes to view an information program, e.g., news program. Consequently, if the microcomputer (1100) identifies that the video-mode-selecting remote-control signal transmitted from the remote controller indicates "cinema mode", the microcomputer (1100) transmits, to the shading-signal generation unit (500), a command for setting the luminance at the screen's peripheral portion relative to the luminance at the screen's central portion at 100% to 80%. Meanwhile, if the microcomputer (1100) identifies that the video-mode-selecting remote-control signal indicates "normal mode", the microcomputer (1100) transmits, to the shading-signal generation unit (500), a command for setting the luminance at the screen's peripheral portion relative to the luminance at the screen's central portion at 80% to 65%.

Also, the types of the video contents to be displayed may also be identified from EPG (: Electronic Program Guide) information which includes broadcasting signals. For example, if a certain program is selected by the user, the genre (such as, e.g., cinema, news, or sports) of the selected program is identified by acquiring the EPG information on the selected program. Moreover, based on this identification result, the shading signals are controlled in much the same way as described above.

In this way, in the present embodiment, it becomes possible to acquire the luminance distribution in accordance with the contents of a video to be displayed, and to reduce the consumption power.

5th Embodiment

Next, referring FIG. 12, the explanation will be given below concerning a fifth embodiment of the present invention. This fifth embodiment differs from the first and fourth embodiments in the following point: Namely, the shading signals are dynamically controlled in accordance with an image signal.

Figure 12:
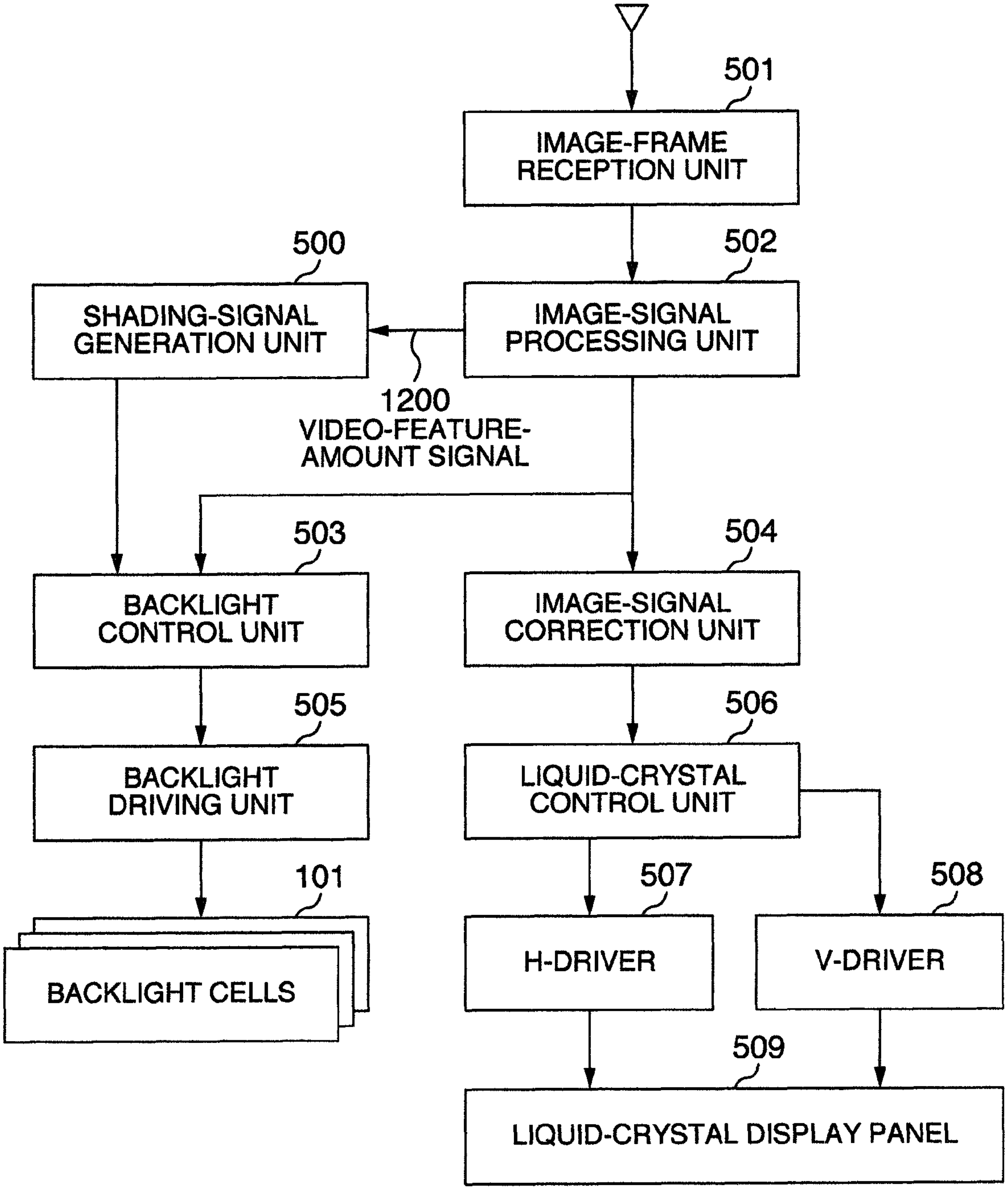
FIG. 12 is a circuit block diagram according to a fifth embodiment.

FIG. 12 illustrates a circuit block diagram in the fifth embodiment. In the circuit block illustrated in FIG. 12, the image-signal processing unit (502) detects the video feature amount from an image signal received thereby. Moreover, the image-signal processing unit (502) transmits, to the shading-signal generation unit (500), a video-feature-amount signal (1200) corresponding to this feature amount detected thereby. Furthermore, based on this video-feature-amount signal (1200), the shading-signal generation unit (500) controls the shading signals. The video-feature-amount signal (1200) transmitted to the shading-signal generation unit (500) includes, e.g., information on the APL (: Average Picture Level) of the video signal of one entire screen, and the positions (i.e., backlight cells) over which a bright object exists whose luminance is higher than a predetermined luminance.

For example, if a bright object exists at the screen's edge portion of an as-a-whole dark video, the humans' attention point is directed and focused onto this bright object. At this time, however, if the luminance of each backlight cell (101) positioned at the screen's peripheral portion is made lower by the execution of the shading processing, the luminance of this bright object is also made lower in accompaniment therewith. As a result, the bright object becomes difficult to see, and thus the as-a-whole dark video looks even darker in some cases.

In view of this situation, in the present embodiment, instead of executing the shading processing all the time, the intensities of the shading signals are changed in accordance with the video-feature-amount signal (1200). For example, the image-signal processing unit (502) calculates the luminance histogram from the video control signal in a portion of the display region corresponding to each backlight cell (101). Then, from the luminance histogram calculated, the mage-signal processing unit (502) identifies the positions of the backlight cells (101) over which the frequencies having a predetermined-luminance-or-higher (e.g., 200 or higher) brightness exist in a predetermined-frequency-or-larger number. This identification of the positions makes it possible to know over which of the backlight cells (101) the bright object exists. Moreover, in order to know the brightness of the image on the entire screen, the image-signal processing unit (502) detects the APL (: Average Picture Level) of one entire image frame. From these detection results, it becomes possible to detect that the video is inputted on which the bright object exists at the screen's edge portion of the as-a-whole dark video.

The image-signal processing unit (502) transmits the above-described detection results, i.e., the position information on the bright object and the APL information, to the shading-signal generation unit (500) as the video-feature-amount signal (1200). In addition, if the APL included in this video-feature-amount signal (1200) is lower than a predetermined value (e.g., 20), and if the position information indicates that the positions of the backlight cells (101) over which the bright object exists are at the screen's end portion (i.e., the backlight cells in the A-th and E-th rows and the first and sixth columns in FIG. 3), the shading-signal generation unit (500) generates the control signals for weakening the luminance lowering at the screen's end portion, or executes the control under which the shading processing itself will not be executed.

The execution of the control like this allows an enhancement in the peak luminance of the bright object which exists at the screen's edge portion. As a result of this enhancement, the bright object becomes easier to see, and the as-a-whole dark video can be prevented from looking even darker. Also, in order to simplify the control, and to enhance the peak luminance of an image whose APL is low, the shading-signal generation unit (500) is also allowed to generate the control signals for weakening the luminance lowering at the screen's end portion, or to execute the control under which the shading processing itself will not be executed.

6th Embodiment

Next, referring FIG. 13, the explanation will be given below regarding a sixth embodiment of the present invention. This sixth embodiment differs from the first and fifth embodiments in the following point: Namely, there is provided an APC (: Auto Power Control) control unit (1300) for executing the power control dynamically. In addition, each control signal allocated to each backlight cell (101) is controlled using this APC control unit (1300).

Figure 13:
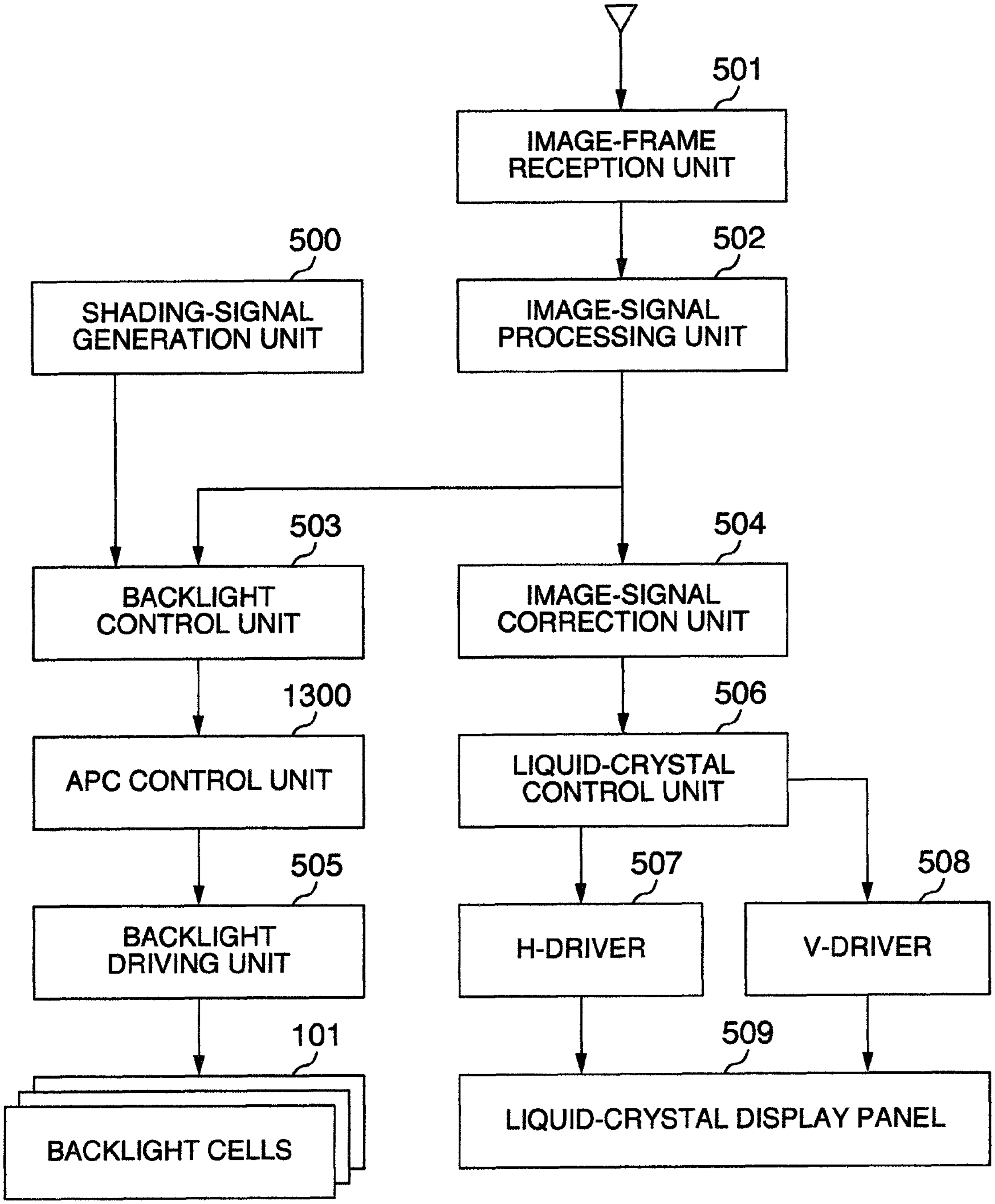
FIG. 13 is a circuit block diagram according to a sixth embodiment.
Figure 14:
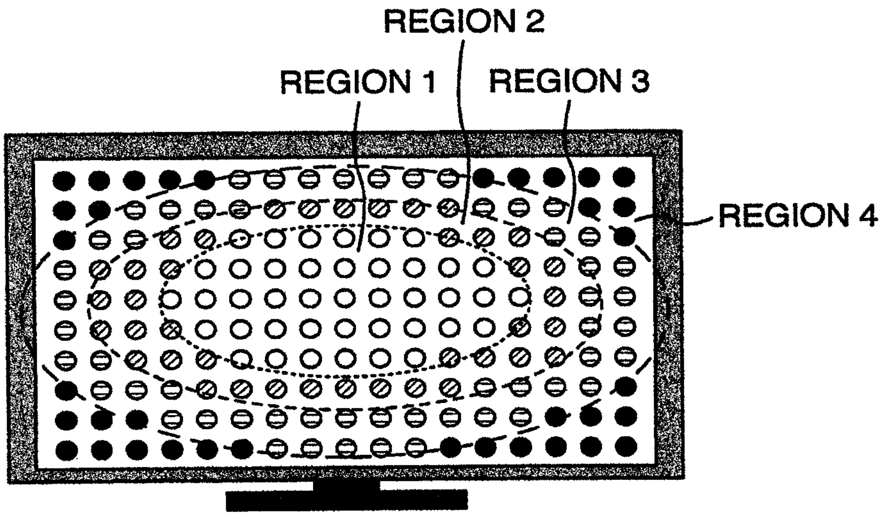
FIG. 14 PRIOR ART
FIG. 14 is the shading-control conceptual diagram in the conventional technology.

FIG. 13 illustrates a circuit block diagram in the sixth embodiment. In the circuit block illustrated in FIG. 13, in the backlight control unit (503), the weight of the light-emission amount of each backlight cell (101) is assigned to each control signal generated by the shading-signal generation unit (500). After that, each weight-assigned control signal is transmitted to the APC control unit (1300). In the APC control unit (1300), each weight-assigned control signal is modulated, then being transmitted to the backlight driving unit (505).

Next, the explanation will be given below concerning the operation of the APC control unit (1300).

Having received the control signals allocated to all of the backlight cells (101), the APC control unit (1300) calculates, from these control signals, the electric power which will be consumed by the entire backlight device of the liquid-crystal display device. Here, for example, if the relationship between the control signals and the consumption power of the entire backlight device is a proportional relationship, it becomes possible to calculate the consumption power of the entire backlight device by summing up the values of the control signals allocated to all of the backlight cells (101). Also, even if the relationship between the control signals and the consumption power is not the proportional relationship, it becomes possible to calculate the consumption power of the entire backlight device in the following way: Namely, the relationship between the control signal and the consumption power in each backlight cell (101) is stored in advance into a memory the representative of which is, e.g., a ROM. Next, the consumption powers corresponding to the control signals allocated to the respective backlight cells (101) are read from the memory, then calculating the sum-total of these consumption powers. The APC control unit (1300) is equipped with the following function: Namely, if the consumption power value calculated thereby has exceeded a constant threshold value, the APC control unit (1300) limits the maximum consumption power in the following way: Namely, the control signals allocated to all of the backlight cells (i.e., the weights-assigned control signals to be used for the shading processing) are equally multiplied by a 1-or-smaller predetermined constant in accordance with a difference between the consumption power value and the above-described constant threshold value. For example, if the constant threshold value is set at 90% of the maximum consumption power, and if the APC control unit (1300) has calculated the consumption power value which is equal to 95% of the maximum consumption power, the APC control unit (1300) limits the maximum consumption power in the following way: Namely, the control signals allocated to all of the backlight cells are equally multiplied by 90/95 (≈0.947). Each control signal, which is allocated to each backlight cell (101), and which is acquired in this way, is then transmitted to the backlight driving unit (505). The backlight driving unit (505) then controls the light-up of each backlight cell (101).

Also, although not illustrated, the above-described constant threshold value may also be switched in accordance with a video mode selected by the user. Also, positioning the APC control unit (1300) at the subsequent stage to the shading-signal generation unit (500) allows the maximum consumption power to be limited without being influenced by the presence-or-absence and magnitude of the shading processing.

Taking advantage of the APC control unit (1300) in this way makes it possible to limit the maximum consumption power which will be consumed by the backlight device. This satisfying result allows the implementation of an enhancement in the further consumption-power reduction effect in addition to the implementation of an enhancement in the power-saving effect obtained from the shading processing.

Incidentally, the above-described light-guiding plate (201) may be provided in each of the plurality of backlight cells (101) in an individual manner. The plurality of light-guiding plates (201), however, may also be connected to each other among the plurality of backlight cells (101). Namely, the plurality of light-guiding plates (201) in the plurality of backlight cells (101) may also be configured using a single unit of integrated light-guiding plate. In this case, it is preferable to form a groove in portions of the integrated light-guiding plate corresponding to the boundaries with the backlight cells (101).

The present invention is applicable to a liquid-crystal display device such as, e.g., liquid-crystal television or mobile-telephone display. In this liquid-crystal display device, the region of backlight cells is divided into a plurality of regions, and the respective resultant regions can be controlled in an individual manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display device including a display panel, and a backlight for illuminating said display panel with light, said image display device, comprising:

a plurality of edge-light-scheme backlight cells including both a plurality of light sources respectively arranged to emit light in a first direction, and a light-guiding plate for introducing light from a backlight control unit for respectively controlling intensity of said light from each of said backlight cells by controlling light intensity of each of the plurality of light sources; wherein the plurality of backlight cells are arranged in a matrix-like manner, said backlight control unit controlling intensity of light from a backlight cell positioned at a screen's peripheral portion in such a manner that said intensity of said light becomes lower than intensity of light from a backlight cell positioned at a screen's central portion, and the backlight control unit being configured to control light intensity of light at one of the backlight cells adjacently positioned on a first end portion of the light panel which is located upstream along the first direction to become higher than light intensity of another one of the backlight cells adjacent to a second portion opposed to the first end portion.

2. The image display device according to claim 1, wherein the first end portion comprises an upper portion of the light panel, and the second end portion comprises a lower portion of the light panel.

3. The image display device according to claim 1, further comprising:

a controller for transmitting a control signal in accordance with a video display mode set by a user; wherein said backlight control unit individually controls said light intensity of each backlight cell in accordance with said control signal transmitted from said controller.

4. The image display device according to claim 1, further comprising:

an image-signal processing unit for detecting a feature amount of an inputted image; wherein said backlight control unit controls a degree of the luminance intensity lowered for a backlight cell positioned at said screen's peripheral portion in accordance with said feature amount of said inputted image detected by said image-signal processing unit.

5. The image display device according to claim 4, wherein said feature amount of said inputted image detected by said image-signal processing unit is average picture level (APL) of said inputted image.

6. The image display device according to claim 1, further comprising:

an APC (auto power control) control unit for limiting maximum consumption power consumed by said backlight; wherein said APC control unit calculates consumption power consumed by said backlight in accordance with a control signal allocated to each backlight cell determined by said backlight control unit, said APC control unit then changing said control signal allocated to each backlight cell, when said consumption power calculated is larger than a predetermined value.

7. A backlight device for illuminating a display panel with light, comprising:

a plurality of edge-light-scheme backlight cells, each of said backlight cells including a plurality of light sources respectively arranged to emit light in a first direction, and a light-guiding plate, said light-guiding plate being configured for introducing light from said light-source therein, and emitting said light therefrom toward said display panel; and a backlight control unit for individually controlling each light-source on each backlight cell by controlling light intensity each of the plurality of light sources; wherein said backlight control unit controls intensity of light from a backlight cell positioned at a screen's peripheral portion in such a manner that said intensity of said light becomes lower than intensity of light from a backlight cell positioned at a screen's central portion, and the backlight control unit being configured to control light intensity of light at one of the backlight cells adjacently positioned on a first end portion of the light panel which is located upstream along the first direction to become higher than light intensity of another one of the backlight cells adjacent to a second portion opposed to the first end portion.

8. An image display device including a display panel, and a backlight for illuminating said display panel with light, said image display device, comprising:

a plurality of edge-light-scheme backlight cells including both a plurality of light sources respectively arranged to emit light in a first direction, and a light-guiding plate for introducing light from a backlight control unit for respectively controlling intensity of said light from each of said backlight cells by controlling light intensity of each of the plurality of light sources; wherein:

the plurality of backlight cells are arranged in a matrix-like manner, each light-source of each of said plurality of backlight cells being so provided as to emit said light in a direction which is oriented from side of a first edge portion of said backlight to side of a second edge portion opposed to said first edge portion, said backlight control unit controlling light intensity of a backlight cell deployed on said first-edge portion side higher than light intensity of a backlight cell deployed on said second-edge portion side, and the backlight control unit being configured to control light intensity of light at one of the backlight cells adjacently positioned on a first end portion of the light panel which is located upstream along the first direction to become higher than light intensity of another one of the backlight cells adjacent to a second portion opposed to the first end portion.

* * * * *